US007551003B2

(12) United States Patent
Sobue

(10) Patent No.: US 7,551,003 B2
(45) Date of Patent: Jun. 23, 2009

(54) CURRENT MIRROR CIRCUIT AND CONSTANT CURRENT CIRCUIT HAVING THE SAME

(75) Inventor: Satoshi Sobue, Nukata-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/213,710

(22) Filed: Jun. 24, 2008

(65) Prior Publication Data

US 2008/0265947 A1 Oct. 30, 2008

Related U.S. Application Data

(62) Division of application No. 11/498,069, filed on Aug. 3, 2006, now Pat. No. 7,498,868.

(30) Foreign Application Priority Data

Aug. 5, 2005 (JP) ............................ 2005-228094
Aug. 31, 2005 (JP) ............................ 2005-251314

(51) Int. Cl.
*G05F 1/10* (2006.01)
*H02J 7/00* (2006.01)

(52) U.S. Cl. ......................... 327/66; 327/538; 327/362; 320/136; 320/134

(58) Field of Classification Search ......... 327/538-540, 327/53, 362, 478, 66; 320/136, 134
See application file for complete search history.

(56) References Cited

U.S. PATENT DOCUMENTS

| | | | | |
|---|---|---|---|---|
| 4,792,748 | A * | 12/1988 | Thomas et al. | 323/312 |
| 5,526,215 | A | 6/1996 | Higashijima et al. | |
| 5,880,625 | A * | 3/1999 | Park et al. | 327/543 |
| 6,384,670 | B1 | 5/2002 | Eagar et al. | |
| 6,411,097 | B1 | 6/2002 | Ashtiani et al. | |
| 6,522,177 | B1 * | 2/2003 | Spampinato | 327/107 |
| 6,885,168 | B2 | 4/2005 | Okumura et al. | |

(Continued)

FOREIGN PATENT DOCUMENTS

JP 401044517 * 2/1989

(Continued)

OTHER PUBLICATIONS

Office Action issued on Jun. 30, 2008 in corresponding U.S. Appl. No. 11/498,069.

(Continued)

*Primary Examiner*—Dinh T. Le
(74) *Attorney, Agent, or Firm*—Posz Law Group, PLC

(57) ABSTRACT

A current mirror circuit includes a pair of first and second transistors having bases connected together and emitters connected to a power line, a resistor connected between the bases of the first and second transistors and the power line, a third transistor for providing base currents of the first and second transistors and a resistor current flowing through the resistor, and a current compensation circuit that adds a compensation current to an input current to the first transistor. The amount of the compensation current is approximately equal to that of the resistor current divided by a current gain of the third transistor. Thus, the compensation current compensates the difference between a collector current of the first transistor and the input current.

13 Claims, 9 Drawing Sheets

U.S. PATENT DOCUMENTS

| | | | | |
|---|---|---|---|---|
| 6,954,058 | B2 * | 10/2005 | Ota et al. | 323/315 |
| 7,183,838 | B2 | 2/2007 | Iwase | |

FOREIGN PATENT DOCUMENTS

| | | |
|---|---|---|
| JP | A-9-204232 | 8/1997 |
| JP | A-2002-111480 | 4/2002 |
| JP | A-2002-281687 | 9/2002 |
| JP | A-2003-070178 | 3/2003 |
| JP | A-2004-80909 | 3/2004 |
| JP | A-2004-248348 | 9/2004 |

OTHER PUBLICATIONS

Office Action dated Oct. 14, 2008 in corresponding Japanese patent application No. 2005-228094 (and English translation).

Office Action issued Jul. 24, 2008 in corresponding Japanese patent application No. 2005-228094 (and English translation).

* cited by examiner

FIG. 6

| EARLY-EFFECT CANCELLATION | WITHOUT | WITHOUT | WITH | WITH |
|---|---|---|---|---|
| CURRENT COMPENSATION | WITHOUT | WITH | WITHOUT | WITH |
| I1 | 6.795 μA | 6.837 μA | 5.179 μA | 5.209 μA |
| I2 | 6.582 μA | 6.622 μA | 5.177 μA | 5.208 μA |
| I3 | 6.368 μA | 6.407 μA | 5.176 μA | 5.207 μA |
| I4 | 6.154 μA | 6.192 μA | 5.175 μA | 5.206 μA |
| I5 | 5.905 μA | 5.905 μA | 5.199 μA | 5.199 μA |
| I6 | 5.719 μA | 5.719 μA | 5.198 μA | 5.198 μA |
| I7 | 5.534 μA | 5.534 μA | 5.197 μA | 5.197 μA |
| I8 | 5.348 μA | 5.348 μA | 5.195 μA | 5.195 μA |
| MEAN | 5.958 μA | 6.071 μA | 5.187 μA | 5.202 μA |
| 3σ | 1.569 μA | 1.493 μA | 0.031 μA | 0.016 μA |

CURRENT MIRROR CIRCUIT AND CONSTANT CURRENT CIRCUIT HAVING THE SAME

CROSS REFERENCE TO RELATED APPLICATION

This application is based on and incorporates herein by reference Japanese Patent Applications No. 2005-228094 filed on Aug. 5, 2005 and No. 2005-251314 filed on Aug. 31, 2005.

FIELD OF THE INVENTION

The present invention relates to a current mirror circuit and a constant current circuit having the same.

BACKGROUND OF THE INVENTION

An assembled battery used for an electric vehicle (EV) and a hybrid vehicle (HV) includes a lot of secondary (i.e., rechargeable) cells connected in series to generate a high voltage ranging from about 100 volts (V) to 400 V. For example, the assembled battery of 300 V is made of 150 lead cells (about 2 V per cell), 250 nickel-hydrogen cells (about 1.2 V per cell), or 80 lithium-ion cells (about 3.6 V per cell) that are connected in series.

The secondary cell, especially, the lithium-ion cell has less resistance to overcharge and overdischarge. If the cell is used outside its specified voltage range, the cell may have significantly reduced cell capacity and produce heat. Therefore, the assembled battery needs cell charge control that keeps voltages of each cell within the specified voltage range. In the assembled battery, each cell has different state of charge, i.e., different voltage, because each cell has different cell capacity and self-discharge characteristic. Therefore, cell voltage equalization is applied to the assembled battery, as disclosed in JP-A-2004-80909 and JP-A-2004-248348.

FIG. 10 is a schematic of a conventional overcharge detection circuit used for an assembled battery 1. The assembled battery 1 includes cells BC1-BC8 connected in series and terminals T1-T8, and TG connected to voltage lines LN1-LN8, and GND, respectively. The terminal TN is a positive terminal of the cell BCN, where N is a positive integer between 1 and 8 inclusive. In other words, the terminal T(M+1) is a negative terminal of the cell BCM, where M is a positive integer between 1 and 7 inclusive. The terminal TG is a negative terminal of the cell BC8. An overcharge detection circuit 2 for the cell BC1 is interposed between the voltage lines LN1, LN2 connected to the terminals T1, T2, respectively. The overcharge detection circuit 2 includes a voltage detection circuit 3 having resistors R1, R2 connected in series, a reference voltage generation circuit 5 having a constant current circuit 4 and a trim resistor R3, and a comparator 6 for comparing a detected voltage with a reference voltage. Each of overcharge detection circuits 2 for the cells BC2-BC8 is similar in structure to the overcharge detection circuit 2 for the cell BC1.

In the structure shown in FIG. 10, each of the overcharge detection circuits 2 for the cells BC1-BC8 needs the constant current circuit 4. Because typically the constant current circuit 4 produces a constant current with a reference voltage generated by a bandgap reference circuit, each of the overcharge detection circuits 2 for the cells BC1-BC8 needs the bandgap reference circuit. Therefore, when the overcharge detection circuits 2 are integrated into a semiconductor integrated circuit (IC), chip size and manufacturing cost of the IC are increased.

A current mirror circuit is widely used in the IC. In the current mirror circuit, output current mirrors input current by a predetermined ratio. The current mirror circuit has a pair of transistors one of which is an input transistor and the other of which is an output transistor. The emitters of the input and output transistors are connected to a power supply line that is grounded. The bases of the input and output transistors are connected to each other. The base and collector of the input transistor are connected to each other directly or through a transistor for supplying base current.

When each of the input and output transistors has the same emitter area and a sufficiently large current gain, the current mirror circuit has a mirror ratio of 1. As a result, the output current becomes equal to the input current. If the current gain is insufficient, the mirror ratio deviates from 1 and the output current becomes smaller than the input current. A current mirror circuit disclosed in JP-A-H9-204232 detects a control current and controls the input current based on the detected control current, thereby reducing the deviation of the mirror ratio.

A resistor may be connected between the power line and a base line to which the bases of the input and output transistors are connected. The resistor reduces impedance of the base line so that resistance to noise can be increased. In a practical circuit, therefore, the resistor is often used to prevent noise. Further, the resistor clamps the electric potential of the base line to the potential of the power line. Therefore, for example, even when system switches to a low power consumption mode and the input current to the current mirror circuit is interrupted, leakage current through the transistors can be prevented by the resistor. As the resistance of the resistor is smaller, the resistor functions more effectively.

However, reduction in resistance of the resistor results in an increase in current flowing the resistor. When the current flowing the resistor becomes equal to or larger than the base current of the transistors, the mirror ration deviates from 1. Therefore, because the resistance of the resistor cannot be reduced below a certain level, the noise and leakage current cannot be fully prevented.

SUMMARY OF THE INVENTION

In view of the above-described problem, it is an object of the present invention to provide a current mirror circuit having a highly accurate mirror ratio and a constant current circuit having the current mirror circuit.

A current mirror circuit includes a first transistor that has an emitter connected to the power line, a second transistor that has an emitter connected to the power line and a base connected to a base of the first transistor, a resistor that has a first end connected between the bases of the first and second transistors and a second end connected to the power line, and a third transistor that has an emitter connected to the base of the first transistor and a base connected to a collector of the first transistor. The third transistor provides base currents of the first and second transistor and a resistor current flowing through the resistor. In this case, a base current of the third transistor causes a difference between a collector current of the first transistor and an input current to the first transistor, i.e., the current mirror circuit.

A resistance of the resistor is set such that the resistor current is larger than each of the base currents of the first and second transistors. Further, this approach clamps a potential of the base line to the power line so that a leak current through the first and second transistors can be prevented when no current flows through the current mirror circuit. As a result of this approach, the resistor becomes dominant in the current flowing though the third transistor.

The current mirror circuit further includes a current compensation circuit that adds a compensation current to an input current flowing through the first transistor. Because an amount of the compensation current is approximately equal to that of the resistor current divided by a current gain of the third transistor, the compensation current compensates the difference between the collector current of the first transistor and the input current to the current mirror circuit. Thus, even when the resistor having relatively low resistance is connected to the base line to prevent the noise and the leak current, the current mirror circuit can have a highly accurate mirror ratio.

A constant current circuit having the current mirror circuit supplies a constant current to circuits such as overcharge detection circuits each of which is provided to each of secondary cells that are connected in series to form an assembled battery. The overcharge detection circuits are divided into at least two groups. The current mirror circuit includes first current mirror circuits each of which is provided to each of the groups, a reference current output circuit provided to one of the groups, and a second current mirror circuit provided to the other of the groups. Each of the first current mirror circuits supplies a reference current to each of the overcharge detection circuits in each of the group. The reference current output circuit supplies the reference current to the first mirror circuit of the one of the groups. The reference current is supplied to the first mirror circuit of the other of the groups through the second mirror circuit. Thus, because not all the overcharge detection circuits needs to have the reference currant output circuit, the constant current circuit can have simple configuration. Therefore, when the constant current circuit is integrated into an IC, chip size of the IC can be reduced so that manufacturing cost of the IC can be reduced.

BRIEF DESCRIPTION OF THE DRAWINGS

The above and other objectives, features and advantages of the present invention will become more apparent from the following detailed description made with reference to the accompanying drawings. In the drawings:

FIG. 6 is a table showing a simulation result of a reference current input to the overcharge detection circuit of FIG. 2;

DETAILED DESCRIPTION OF THE PREFERRED EMBODIMENTS

First Embodiment

Figure 1:
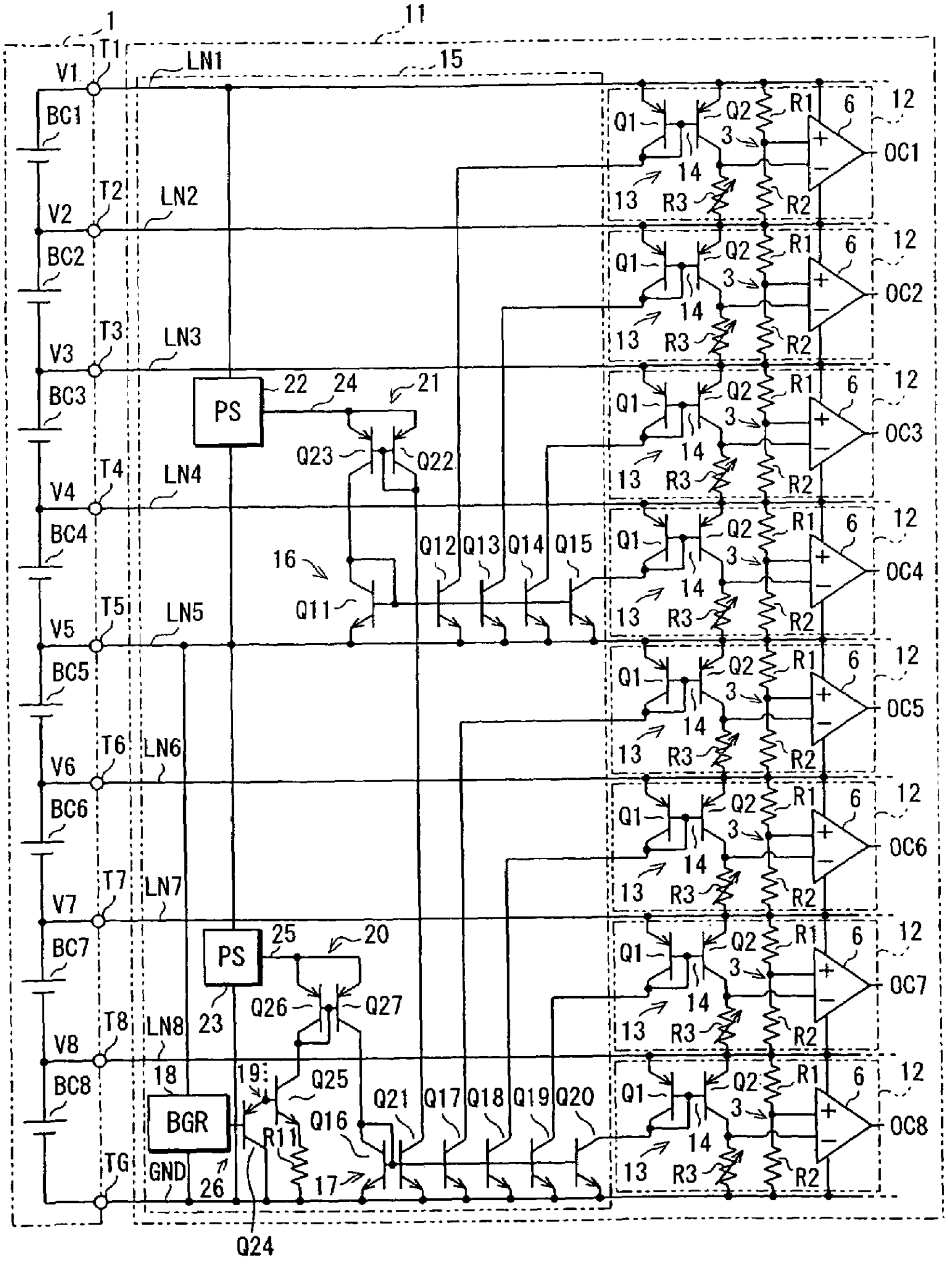
FIG. 1 is a schematic of a constant current circuit and an overcharge detection circuit according to a first embodiment of the present invention.
Figure 2:
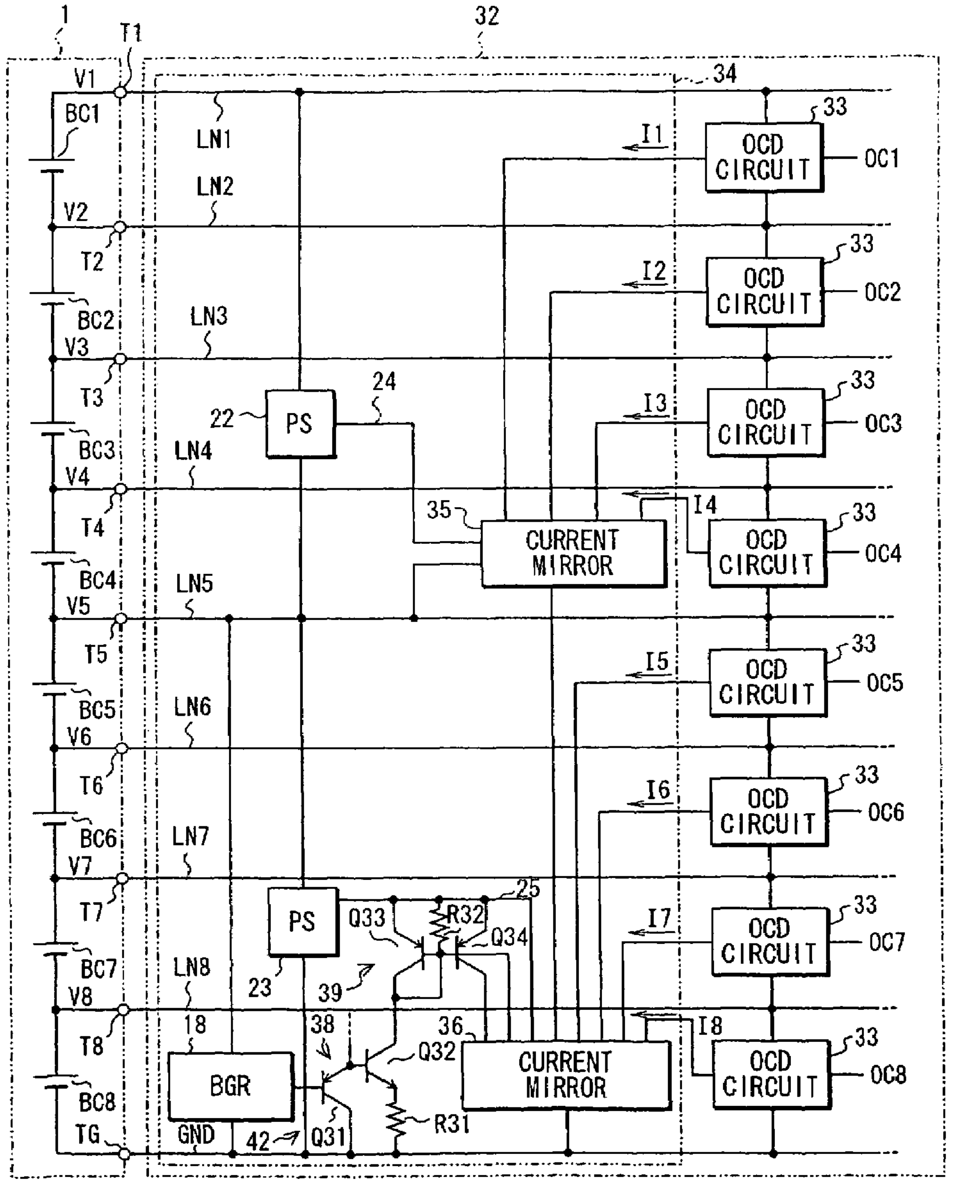
FIG. 2 is a schematic of a constant current circuit and an overcharge detection circuit according to a second embodiment of the present invention.

Referring to FIG. 1, a first embodiment of the present invention is described.

An assembled battery 1 may be, for example, used for an electric vehicle (EV) and a hybrid vehicle (HV). The assembled battery 1 includes multiple cell groups of secondary cells such as lithium-ion cells (3.6 V per cell). The cell groups are connected in series. Each cell group has eight cells BC1-BC8 that are connected in series. Each cell group has terminals T1-T8, and TG. The terminal TN is a positive terminal of the cell BCN, where N is a positive integer between 1 and 8 inclusive. In other words, the terminal T(M+1) is a negative terminal of the cell BCM, where M is a positive integer between 1 and 7 inclusive. The terminal TG is a negative terminal of the cell BC8.

A control IC 11 monitors and controls a state of charge (SOC) of the assembled battery 1. Each cell group is provided with the control IC 11. The control IC 11 detects voltages of each of the cells BC1-BC8 and performs a charge/discharge control that keeps the SOC of each of the cells BC1-BC8 in a proper state. In the control IC 11, each of the cells BC1-BC8 is provided with an overcharge detection circuit 12 and an overdischarge detection circuit (not shown) that is similar in structure to the overcharge detection circuit 12. When the assembled battery 1 is connected to the control IC 11, the terminals T1-T8 of the assembled battery 1 are connected to voltage lines LN1-LN8 of the control IC 11, respectively. The terminal TG of the assembled battery 1 is connected to a voltage line GND of the control IC 11.

The overcharge detection circuit 12 includes a reference voltage generation circuit 13, a voltage detection circuit 3, and a comparator 6. The reference voltage generation circuit 13 includes a trim resistor R3 and a current mirror circuit 14 having PNP transistors Q1, Q2. The voltage detection circuit 3 includes resistors R1, R2 connected in series.

As an example, in the overcharge detection circuit 12 for the cell BC1, the emitters of the transistors Q1, Q2 are connected to the voltage line LN1 and the trim resistor R3 is connected between the collector of the transistor Q2 and the voltage line LN2. The resistors R1, R2 are connected in series between the voltage lines LN1, LN2. The voltage lines LN1, LN2 are connected to the positive terminal T1 and the negative terminal T2 of the cell BC1, respectively.

The comparator 6 is powered by a voltage of the cell BC1, i.e., a voltage between the voltage lines LN1, LN2. The comparator 6 compares a reference voltage output from the reference voltage generation circuit 13 with a detection (cell) voltage output from the voltage detection circuit 3 and outputs an overcharge detection signal OC1 based on a result of the comparison. Each of the overcharge detection circuits 12 for the cells BC2-BC8 is similar in structure to the overcharge detection circuit 3 for the cell BC1. Therefore, the overcharge detection circuits 3 for the cells BC2-BC8 outputs overcharge detection signals OC2-OC8, respectively.

When a highly accurate reference current flows through the trim resistor R3 via the current mirror circuit 14, the reference voltage generation circuit 13 can generate a highly accurate reference voltage. The control IC 11 has a constant current circuit 15 that supplies the highly accurate reference current to each overcharge detection circuit 3.

The constant current circuit 15 includes current mirror circuits 16, 17. The current mirror circuit 16 supplies the reference current to a first circuit group of four overcharge detection circuits 3 for a first cell subgroup of the cells BC1-BC4. The current mirror circuit 17 supplies the reference current to a second circuit group of four overcharge detection circuits 3 for a second cell subgroup of the cells BC5-BC8.

The constant current circuit 15 further includes a bandgap reference (BGR) circuit 18, a voltage-to-current converter 19, current mirror circuits 20, 21, and power supply (PS) circuits 22, 23. The bandgap reference circuit 18 and the voltage-to-current converter 19 form a reference current output circuit 26.

The bandgap reference circuit 18 outputs a reference voltage VBG to the voltage-to-current converter 19. The voltage-to-current converter 19 converts the reference voltage VBG into a reference current and outputs the reference current to the current mirror circuit 20. The current mirror circuit 20 passes the reference current through the current mirror circuit 17. The current mirror circuit 21 passes the reference current flowing through the current mirror circuit 17 through the current mirror circuit 16.

The current mirror circuit 16 includes a transistor Q11 (as a current input transistor in the invention) and transistors Q12-Q15 (as a current output transistor). Each of the transistors Q11-Q15 has the emitter connected to the voltage line LN5 connected to the terminal T5. The terminal T5 is the negative terminal of the cell BC4 that is arranged on a lowest potential side in the first cell subgroup of the cells BC1-BC4. The bases of the transistors Q11-Q11 are connected to each other. The collectors of the transistors Q12-Q15 are connected to the collectors of the transistors Q1 of the overcharge detection circuits 12 for the cells BC1-BC4, respectively.

The current mirror circuit 17 includes a transistor Q16 (as the current input transistor), transistors Q17-Q20 (as the current output transistor), and a transistor Q21. Each of the transistors Q16-Q21 has the emitter connected to the voltage line GND. The bases of the transistors Q16-Q21 are connected to each other. The collectors of the transistors Q17-Q20 (as the current output transistor) are connected to the collectors of the transistors Q1 of the overcharge detection circuits 12 for the cells BC5-BC8, respectively.

The power supply circuit 22 is supplied with a voltage between the voltage lines LN1, LN5 and outputs a constant voltage (e.g., 5 V) through a power line 24. The power supply circuit 23 is supplied with a voltage (i.e., the sum of the individual voltages of the cells BC1-BC4) between the voltage lines LN5, GND and outputs the constant voltage through a power line 25.

The current mirror circuit 21 has transistors Q22, Q23. The transistor Q22 is connected between the power line 24 and the collector of the transistor Q21. The transistor Q23 is connected between the power line 24 and the collector of the transistor Q11.

The bandgap reference circuit 18 is supplied with the voltage between the voltage lines LN5, GND and outputs the reference voltage VBG.

The voltage-to-current converter 19 includes transistors Q24, Q25, a resistor R11, and a current source circuit (not shown). The emitter of the transistor Q24 is connected to the base of the transistor Q25. The resistor R11 is connected between the emitter of the transistor Q25 and the voltage line GND. The current source circuit is connected to the emitter of the transistor Q24, i.e., the base of the transistor Q25.

The current mirror circuit 20 includes transistors Q26, Q27. The transistor Q26 is connected between the power line 25 and the collector of the transistor Q25. The transistor Q27 is connected between the power line 25 and the collector of the transistor Q16.

Operations of the control IC 11 are described below.

Whereas the lithium-ion cell has high mass energy density, high volume energy density, and long cycle life, the lithium-ion cell has less resistance to overcharge and overdischarge. Therefore, the overcharge detection circuit 12 and the overdischarge detection circuit (not shown) need to detect overcharge and overdischarge state of the cells BC1-BC8 highly accurately.

The bandgap reference circuit 18 outputs the reference voltage VBG to the voltage-to-current converter 19. The voltage-to-current converter 19 converts the reference voltage VBG into the reference current and outputs the reference current to the current mirror circuit 20. The current mirror circuit 20 reverses the direction of flow of the reference current so that the reference current flows through the current mirror circuit 17. In the current mirror circuit 17, the reference current is output to each of the reference voltage generation circuits 13 of the overcharge detection circuits 12 for the cells BC5-BC8 via the transistors Q17-Q20, respectively. In the reference voltage generation circuit 13, the reference current flows through the trim resistor R3 via the current mirror circuit 14. Thus, the reference voltage generation circuit 13 generates the reference voltage.

Further, in the current mirror circuit 17, the reference current is output to the current mirror circuit 21 via the transistor Q21. The current mirror circuit 21 reverses the direction of flow of the reference current so that the reference current flows through the current mirror circuit 16. In the current mirror circuit 16, the reference current is output to each of the reference voltage generation circuits 13 of the overcharge detection circuits 12 for the cells BC1-BC4 via the transistors Q12-Q15, respectively.

In this case, a relation between the reference voltage VBG and the reference current flowing through the trim resistor R3 depends on the resistor R11 of the voltage-to-current converter 19 and mirror ratios of the current mirror circuits 14, 16, 17, 20, 21. Laser trimming of the trim resistor R3 can reduce variations in the reference current due to variations in resistance and mirror ratio. In other words, the laser trimming of the trim resistor R3 can reduce variations in the reference voltage output from the reference voltage generation circuit 13.

In this embodiment, not all of the overcharge detection circuits 12 for the cells BC1-BC8 is provided with the bandgap reference circuit 18. Specifically, because the current mirror circuit 21 passes the reference current flowing through the current mirror circuit 17 to the current mirror circuit 16, the control IC 11, which controls the eight cells BC1-BC8, needs only one bandgap reference circuit 18. Therefore, the control IC 11 can have simple configuration, i.e., small size without loss of accuracy so that manufacturing cost of the control IC 11 can be significantly reduced.

As described above, one cell group includes the eight cells BC1-BC8 that are connected in series. The group of the eight cells BC1-BC8 is divided into two cell subgroups. The cell subgroup includes the four cells BC1-BC4 and the cell subgroup includes the four cells BC5-BC8. The current mirror circuit 16 is provided to the first subgroup of the four cells BC1-BC4 such that the emitters of the transistors Q11-Q15 are connected to the voltage line LN5 connected to the terminal T5. The terminal T5 is the negative terminal of the cell BC4 that is arranged on the lowest potential side in the first subgroup. The current mirror circuit 17 is provided to the second subgroup of the four cells BC5-BC8 such that the emitters of the transistors Q16-Q21 are connected to the voltage line GND connected to the terminal TG. The terminal TG is the negative terminal of the cell BC8 that is arranged on the lowest potential side in the second subgroup.

In the current mirror circuit 16, a voltage applied to the transistor Q12 is highest. A collector-to-emitter voltage VCE (Q12) of the transistor Q12 satisfies the following equation:

$$VCE(Q12) \leqq VBC1+VBC2+VBC3+VBC4 \approx 4 \cdot VBC \quad (1)$$

In the equation (1), VBCN is a voltage of the cell BCN, where N is a positive integer between 1 and 4 inclusive and VBC is an average voltage of the cells BC1-BC4. Likewise, collector-to-emitter voltages VCE(Q13), VCE(Q14), and VCE(Q15) of the transistors Q13, Q14, and Q15 are kept below 3VBC, 2VBC, and VBC, respectively.

If one current mirror circuit is provided to the cell group of the eight cells BC1-BC8 such that the emitters of the transistors are connected to the voltage line GND, collector-to-emitter voltages VCE of the transistors corresponding to the cells BC1-BC4 are 8VBC-5VBC, respectively. Therefore, the voltage applied to each of the transistors Q12-Q15 can be reduced by half or more by equally dividing the cell group of the eight cells BC1-BC8 into the two cell subgroups, each of which has the same number of the cells.

Second Embodiment

Referring to FIGS. 2-8, a second embodiment of the present invention is described.

A control IC 32 monitors and controls the state of charge (SOC) of the assembled battery 1. Each of the cell groups is provided with the control IC 32. The control IC 32 detects the voltage of each of the cells BC1-BC8 and performs the charge/discharge control that keeps the SOC of each of the cells BC1-BC8 in the proper state.

The control IC 32 includes a constant current circuit 34, an overcharge detection (OCD) circuit 33, and an overdischarge detection circuit (not shown) that is similar in structure to the overcharge detection circuit 33.

Each of the cells BC1-BC8 is provided with the overcharge detection circuit 33 and the overdischarge detection circuit. When the assembled battery 1 is connected to the control IC 32, the terminals T1-T8 of the assembled battery 1 are connected to voltage lines LN1-LN8 of the control IC 32, respectively. The terminal TG of the assembled battery 1 is connected to a voltage line GND of the control IC 32.

The overcharge detection circuit 33 requires a highly accurate reference current to generate a highly accurate reference voltage. The constant current circuit 34 supplies the highly accurate reference current to each overcharge detection circuit 33. The constant current circuit 34 includes a current mirror circuit 35 and a current mirror circuit 36 (as a first current mirror circuit in the invention). The current mirror circuit 35 supplies the reference current to the first circuit group of four overcharge detection circuits 33 for the first cell subgroup of the cells BC1-BC4. The current mirror circuit 36 supplies the reference current to the second circuit group of four overcharge detection circuits 33 for the second cell subgroup of the cells BC5-BC8.

The constant current circuit 34 further includes the bandgap reference circuit 18, a voltage-to-current converter 38, a current mirror circuit 39, and the power supply circuits 22, 23. The bandgap reference circuit 18 and the voltage-to-current converter 38 form a reference current output circuit 42.

The bandgap reference circuit 18 outputs the reference voltage VBG to the voltage-to-current converter 38. The voltage-to-current converter 38 converts the reference voltage VBG into a reference current and outputs the reference current to the current mirror circuit 39. The current mirror circuit 39 passes the reference current through the current mirror circuit 36.

The bandgap reference circuit 18 is supplied with the voltage between the voltage lines LN5, GND and outputs the reference voltage VBG.

The voltage-to-current converter 38 includes transistors Q31, Q32, a resistor R31, and a current source circuit (not shown). The transistor Q31 has the emitter connected to the base of the transistor Q32, the collector connected to the voltage line GND, and the base connected to the bandgap reference circuit 18. The resistor R31 is connected between the emitter of the transistor Q32 and the voltage line GND. The base of the transistor Q32 is connected to the current source circuit.

The current mirror circuit 39 includes transistors Q33, Q34, and a resistor R32. The bases of the transistors Q33, Q34 are connected to each other. The emitters of the transistors Q33, Q34 are connected to the power line 25.

Figure 4:
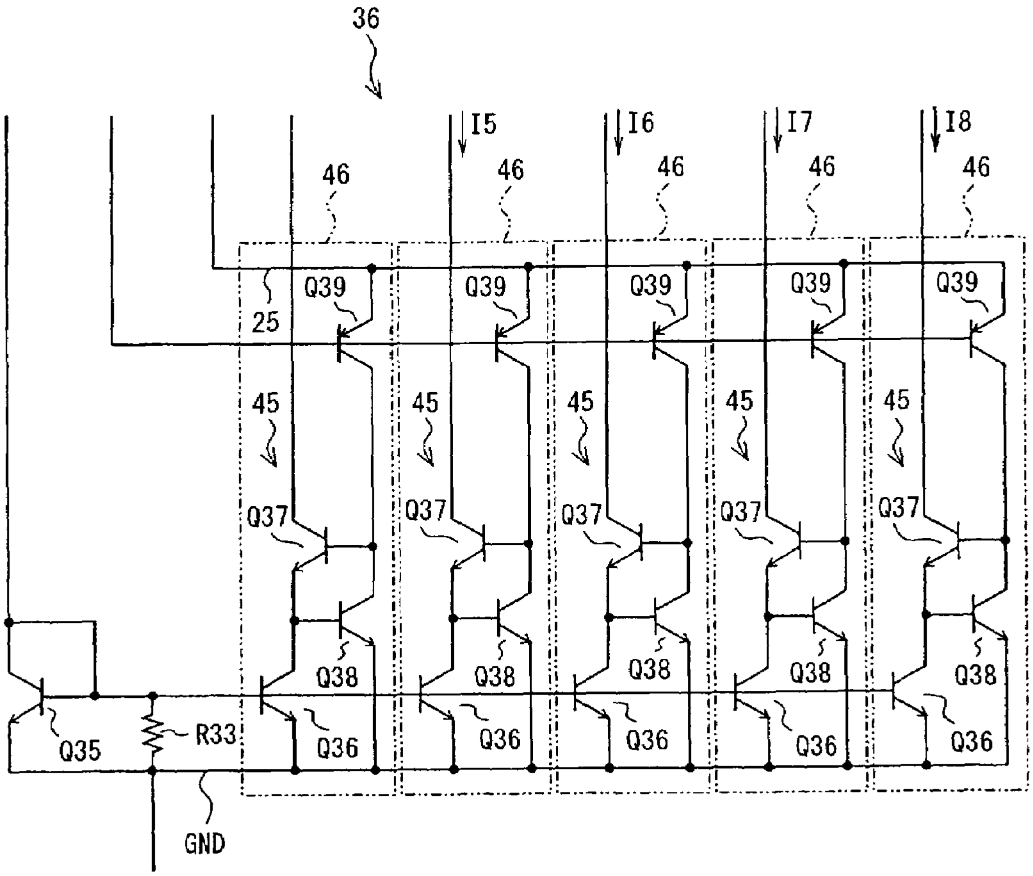
FIG. 4 is a schematic of a current mirror circuit provided to a cell subgroup of cells arranged on a low potential side of the assembled battery of FIG. 2.

FIG. 4 is a schematic of the current mirror circuit 36. The current mirror circuit 36 includes a transistor Q35, a resistor R33, and five sub-circuits 46. Each of the sub-circuits 46 includes a transistor Q36 and an early-effect cancellation circuit 45 connected to the collector of the transistor Q36.

The transistor Q36 is paired with the transistor Q35. The bases of the transistors Q35, Q36 are connected to each other. The emitters of the transistors Q35, Q36 are connected to the voltage line GND. The resistor R33 is connected between the base of the transistor Q36 (Q35) and the voltage line GND. The base and collector of the transistor Q35 are connected to the collector of the transistor Q34 of the current mirror circuit 39.

The early-effect cancellation circuit 45 includes transistors Q37-Q39. The transistor Q37 is connected in series with the transistor Q36 such that the emitter of the transistor Q37 is connected to the collector of the transistor Q36. The transistor Q38 has the emitter connected to the voltage line GND, the base connected to the collector of the transistor Q36, and the collector connected to the base of the transistor Q37. The transistor Q39 has the emitter connected to the power line 25 and the collector connected to the collector of the transistor Q38. The base of the transistor Q39 is connected to the base of the transistor Q34 (Q33) of the current mirror circuit 39. Thus, the transistor Q39 is a part of the current mirror circuit 39 and works as a constant current circuit.

The current mirror circuit 36 is supplied with the reference current from the reference current output circuit 42 through the current mirror circuit 39. In the current mirror circuit 36, the reference current is supplied to each of the four overcharge detection circuits 33 for the cells BC5-BC8 and the current mirror circuit 35 through the five sub-circuits 46.

Figure 3:
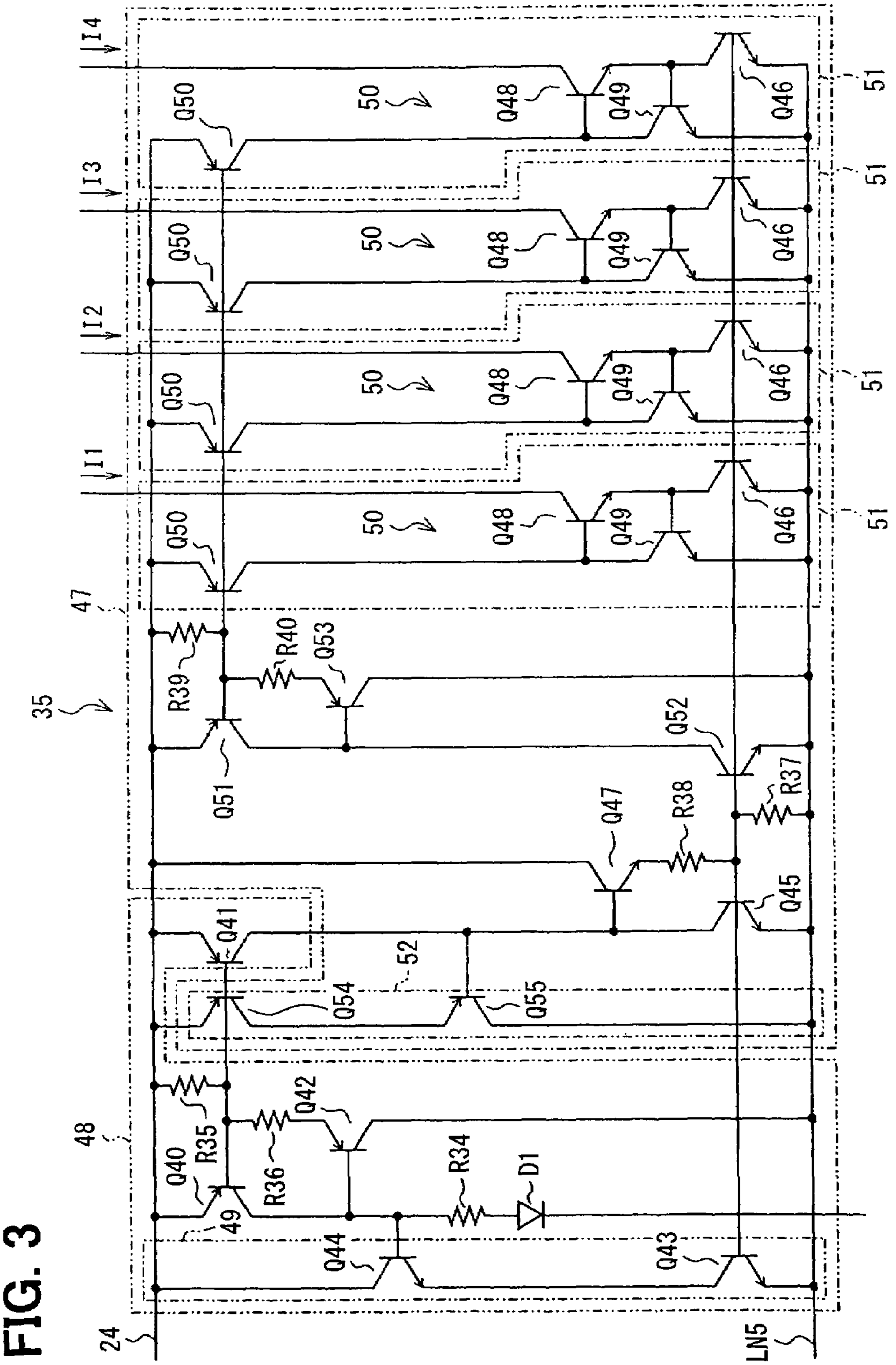
FIG. 3 is a schematic of a current mirror circuit provided to a cell subgroup of cells arranged on a high potential side of an assembled battery of FIG. 2.

FIG. 3 is a schematic of the current mirror circuit 35. The current mirror circuit 35 has a current mirror circuit 47 (as the first current mirror circuit) and a current mirror circuit 48 (as a second current mirror circuit).

The current mirror circuit 48 includes a pair of transistors Q40 (as a first transistor), Q41 (as a second transistor), a transistor Q42 (as a third transistor), resistors R34-R36, and a diode D1 for preventing reverse current. The bases of the transistors Q40, Q41 are connected to each other. The emitters of the transistors Q40, Q41 are connected to the power line 24. The collector of the transistor Q40 is connected to the collector of the transistor Q37 of the current mirror circuit 36 through the resistor R34 and the diode D1.

The resistor R35 is connected between the base of the transistor Q40 (Q41) and the power line 24. The resistance of the resistor R35 is set such that the amount of current flowing through the resister R35 is larger than that of the base current of the transistor Q40 (Q41). The resistor R36 is connected between the base of the transistor Q40 and the emitter of the transistor Q42. The base of the transistor Q42 is connected to the collector of the transistor Q40. The collector of the transistor Q42 is connected to the voltage line LN5. The transistor Q42 supplies the base current to the transistors Q40, Q41.

The current mirror circuit 48 further includes a current compensation circuit 49. The current compensation circuit 49 has transistors Q43 (as a fourth transistor), Q44 (as a fifth transistor) that are connected in series between the voltage line LN5 and the power line 24. The base of the transistor Q44 is connected to the collector of the transistor Q40, i.e., the base of the transistor Q42. The base current of the transistor Q44 is a compensation current.

The current mirror circuit 47 includes transistors Q45 (as the first transistor), Q47 (as the third transistor), Q51-Q53, resistors R37-R40, and four sub-circuits 51. Each of the sub-circuits 51 includes a transistor Q46 (as the second transistor) and an early-effect cancellation circuit 50 connected to the collector of the transistor Q46.

The transistor Q46 is paired with the transistor Q45. The bases of the transistors Q45, Q46 are connected to each other. The emitters of the transistors Q45, Q46 are connected to the voltage line LN5. The collector of the transistor Q45 is connected to the collector of the transistor Q41 of the current mirror circuit 48. The base and emitter of the transistor Q45 (Q46) are connected to the base and emitter of the transistor Q43 of the current mirror circuit 48, respectively.

The resistor R37 is connected between the base of the transistor Q45 (Q46) and the voltage line LN5. The resistance of the resistor R37 is set such that the amount of current flowing through the resister R37 is larger than that of the base current of the transistor Q45 (Q46). The resistor R38 is connected between the base of the transistor Q45 and the emitter of the transistor Q47. The base of the transistor Q47 is connected to the collector of the transistor Q45. The collector of the transistor Q47 is connected to the power line 24.

The early-effect cancellation circuit 50 includes transistors Q48-Q50. The transistor Q48 (as a sixth transistor) is connected in series with the transistor Q46 such that the emitter of the transistor Q48 is connected to the collector of the transistor Q46. The transistor Q49 (as a seventh transistor) has the emitter connected to the voltage line LN5, the base connected to the collector of the transistor Q46, and the collector connected to the base of the transistor Q48. The transistor Q50 is connected between the power line 24 and the collector of the transistor Q49.

The transistors Q51, Q52 are connected in series between the power line 24 and the voltage line LN5. The transistors Q50, Q51 Q53 and the resistors R39, R40 form a current mirror circuit. The base of the transistor Q52 is connected to the base of the transistor Q45 (Q46). The emitter of the transistor Q52 is connected to the emitter of the transistor Q45 (Q46). Thus, the current flowing through each of the transistors Q45, Q46 is the same as the current flowing through each of the transistors Q50-Q52.

The current mirror circuit 47 further includes a current compensation circuit 52. The current compensation circuit 52 has transistors Q54 (as the fourth transistor), Q55 (as the fifth transistor) that are connected in series between the power line 24 and the voltage line LN5. The base of the transistor Q54 is connected to the collector of the transistor Q40 (Q41) of the current mirror circuit 48. The emitter of the transistor Q54 is connected to the emitter of the transistor Q40 (Q41) of the current mirror circuit 48. The base of the transistor Q55 is connected to the collector of the transistor Q45, i.e., the base of the transistor Q47. The base current of the transistor Q55 is a compensation current.

Figure 5:
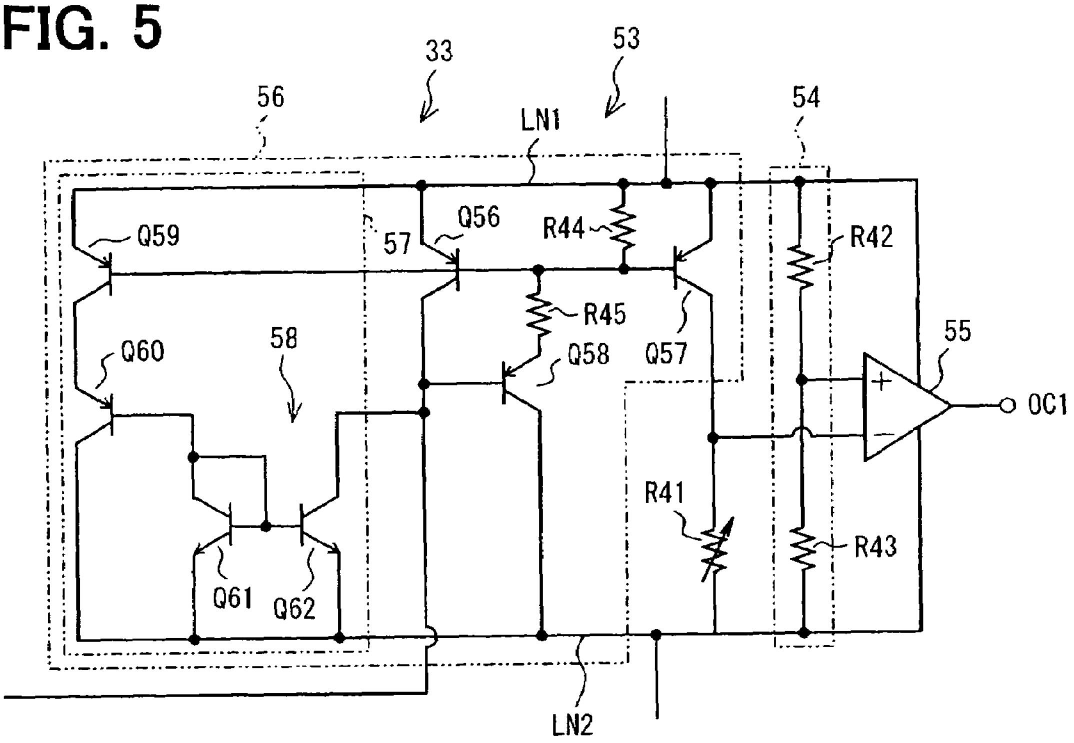
FIG. 5 is a schematic of the overcharge detection circuit of FIG. 2.

FIG. 5 is a schematic of the overcharge detection circuit 33 for the cell BC1. The overcharge detection circuit 33 includes a reference voltage generation circuit 53, a voltage detection circuit 54, and a comparator 55. The voltage detection circuit 54 has resistors R42, R43 that are connected in series between the voltage line LN1 connected to the terminal T1 and the voltage line LN2 connected to the terminal T2. The terminal T1 is the positive terminal of the cell BC1 and the terminal T2 is the negative terminal of the cell BC1.

The comparator 55 is powered by the voltage between the voltage lines LN1, LN2. The comparator 55 compares a reference voltage output from the reference voltage generation circuit 53 with a detection voltage (cell voltage) output from the voltage detection circuit 54 and outputs the overcharge detection signal OC1 based on the result of the comparison. Each of the overcharge detection circuits 33 for the cells BC2-BC8 is similar in structure to the overcharge detection circuit 33 for the cell BC1. Therefore, the overcharge detection circuits 33 for the cells BC2-BC8 outputs overcharge detection signals OC2-OC8, respectively.

The reference voltage generation circuit 53 includes a trim resistor R41 and a current mirror circuit 56 that passes the reference current output from the current mirror circuit 35 through the trim resistor R41. When the reference current flowing through the trim resistor R41 is highly accurate, the reference voltage generation circuit 53 can generate the highly accurate reference voltage. The current mirror circuit 56 has a current compensation circuit 57. The remainder of the current mirror circuit 56, apart from the current compensation circuit 57, is the equivalent of the current mirror circuit 48. Transistors Q56-Q58 and resistors R44, R45 of the current mirror circuit 56 corresponds to the transistors Q40-Q42 and resistors R35, R36 of the current mirror circuit 48, respectively.

The current compensation circuit 57 has a current mirror circuit 58 and transistors Q59 (as the fourth transistor), Q60 (as the fifth transistor) that are connected in series between the voltage lines LN1, LN2. The base of the transistor Q59 is connected to the bases of the transistors Q56, Q57. The emitter of the transistor Q59 is connected to the emitters of the transistors Q56, Q57. The current mirror circuit 58 includes transistors Q61, Q62. The transistor Q61 is connected between the voltage line LN2 and the base of the transistor Q60. The transistor Q62 is connected between the voltage line LN2 and the collector of the transistor Q56, i.e., the base of the transistor Q58. The base current of the transistor Q60 is a compensation current.

Operations of the control IC 32 are described below.

The bandgap reference circuit 18 outputs the highly accurate reference voltage VBG to the voltage-to-current converter 38. The voltage-to-current converter 38 converts the reference voltage VBG into the reference current. The current mirror circuit 39 reverses the direction of flow of the reference current so that the reference current flows through the current mirror circuit 36. In the current mirror circuit 36, the reference current is output to the reference voltage generation circuits 53 of the overcharge detection circuits 33 for the cells BC5-BC8 via each transistor Q36, which is connected to the early-effect cancellation circuit 45. In the reference voltage generation circuit 53, the reference current flows through the trim resistor R41 via the current mirror circuit 56. Thus, the reference voltage generation circuit 53 generates the reference voltage.

Further, in the current mirror circuit 36, the reference current is output to the current mirror circuit 48 of the current mirror circuit 35. The current mirror circuit 48 reverses the direction of flow of the reference current so that the reference current flows through the current mirror circuit 47. In the current mirror circuit 47, the reference current is output to the reference voltage generation circuits 53 of the overcharge detection circuits 33 for the cells BC1-BC4 via each transistor Q36, which is connected to the early-effect cancellation circuit 45. In this case, a relation between the reference voltage VBG and the reference current flowing through the trim resistor R41 depends on the resistor R31 of the voltage-to-current converter 38 and mirror ratios of the current mirror circuits 39, 36, 47, 48, 56.

The reference current output from the current mirror circuit 39 is distributed to each trim resistor R41 through the current mirror circuits 35, 36, and 56. The current mirror circuit 35 includes the current compensation circuits 49, 52 and the early-effect cancellation circuit 50. The current mirror circuit 36 includes the early-effect cancellation circuit 45. The current mirror circuit 56 includes the current compensation circuit 57. Thus, variations in the reference current flowing through each trim resistor R41 can be reduced. In other words, the reference current flowing through each trim resistor R41 is approximately the same. The current mirror circuit 39 may also have the current compensation circuit and the early-effect cancellation circuit.

Laser trimming of the trim resistor R41 can reduce the variations in the reference current due to variations in resistance and mirror ratio. In other words, the laser trimming of the trim resistor R33 can reduce the variation in the reference voltage output from the reference voltage generation circuit 53.

In the current mirror circuits 39, 36, 47, 48, 56, the resistors R32, R33, R37, R35, R44 are connected between a base line connected to the base of the transistors and the voltage line or the power line. Each of the resistances of the resistors R32, R33, R35, R37, R44 is set such that the amount of current flowing through each of the resistors R32, R33, R35, R37, R44 is larger than that of the base current of the transistor. In such an approach, impedance of the base line is reduced so that resistance to noise can be increased. Further, the base line is held at the same potential as the power line or the voltage line, when no reference current flows through the current mirror circuits 39, 36, 47, 48, 56. Thus, leakage current through the transistors Q33-Q36, Q40, Q41, Q45, Q46, Q56, Q57 can be prevented.

As an example, the effect of addition of the resistor R35 to the current mirror circuit 48 is described below.

A current Ic(Q42) flowing from the base line connected to the bases of the transistors Q40, Q41 to the transistor Q42 is given by the following equation:

$$Ic(Q42) = \frac{VF}{R35} + \frac{Ic(Q40)}{hFE(Q40)} + \frac{Ic(Q41)}{hFE(Q41)} + \frac{Ic(Q54)}{hFE(Q54)} \quad (2)$$

In the equation (2), VF represents a forward voltage of a PN junction and hFE represents DC gain of the transistor.

Because the transistors Q40, Q41, Q54 have the same characteristic and size, the transistors Q40, Q41, Q54 have the same DC gain, i.e., hFE(Q40)=hFE(Q41)=hFE(Q54). Therefore, the equation (2) can be approximated as follows:

$$Ic(Q42) = \frac{VF}{R35} + 3 \cdot \frac{Ic(Q40)}{hFE(Q40)} \quad (3)$$

When the current (i.e., VF/R35) flowing through the resistor R35 becomes equal to or larger than the base current (e.g., Ic(Q40)/hFE(Q40)) of the transistors Q40, Q41, Q54, the current flowing through the resistor R35 becomes dominant in the current Ic(Q42). Therefore, the current flowing through the resistor R35 may affect the mirror ratio of the current mirror circuit 48. For example, when the resistor R35 has a resistance of 140 kilo ohms (kΩ), the forward voltage VF is about 0.7 V. Therefore, the current of 5 microamperes (μA) flows through the resistor R35. Typically, in the control IC 32, a small signal current ranging from a few microamperes to a few tens of microamperes flows. In this case, when the DC gain is 100, the base current generally ranges from a few tens of nanoamperes to a few hundreds of nanoamperes. Therefore, the equation (3) can be approximated as follows:

$$Ic(Q42) = \frac{VF}{R35} \quad (4)$$

When the equation (4) is used, a base current Ib(Q42) of the transistor Q42 is given by the following equation:

$$Ib(Q42) = \frac{(VF/R35)}{hFE(Q42)} \quad (5)$$

When a part of the current input to the current mirror circuit 48 is used as the base current Ib(Q42), a collector current Ic(Q40) of the transistor Q40 decreases accordingly. As a result, the mirror ratio deviates from 1. The current compensation circuit 49 produces a base current Ib(Q44) of the transistor Q44 as the compensation current. Because the amount of the base current Ib(Q44) is equal to the amount of the base current Ib(Q42), the deviation in the mirror ratio can be prevented.

The transistors Q43, Q45 form the current mirror circuit and the collector current of the transistor Q41 flows through the transistor Q45. Therefore, the current flowing through each of the transistors Q43, Q44 is the same as the collector current of the transistor Q41. In this case, the base current Ib(Q44) is given by the following equation:

$$Ib(Q44) = \frac{Ic(Q44)}{hFE(Q44)} \quad (6)$$

Because the transistors Q42, Q44 have the same characteristic and size, the transistors Q42, Q44 have the same DC gain, i.e., hFE(Q42)=hFE(Q44). Therefore, the base current Ib(Q42) is equal to the base current Ib(Q44) when the following equation (7) is satisfied:

$$Ic(Q44) = \frac{VF}{R35} \quad (7)$$

Thus, when the current flowing through the resistor R35 is equal to the current flowing through the transistor Q41 (Q44), the base current Ib(Q42) is fully compensated so that the mirror ratio can be made very close to 1. Even when the equation (7) is not satisfied, the compensation effect can be obtained as long as the following equation is satisfied:

$$|Ib(Q42)-Ib(Q44)|<Ib(Q42) \quad (8)$$

The same holds true for the current mirror circuits 47, 56. In the current mirror circuit 56, the emitters of the transistors Q56, Q57, Q59 are connected to each other and the bases of the transistors Q56, Q57, Q59 are connected to each other. Therefore, the current mirror circuit 56 has the current mirror circuit 58 for turning the direction of flow of the base current of the transistor Q60, i.e., for passing the base current of the transistor Q60 through the transistor Q62.

The current mirror circuits 36, 47 operate based on the voltage lines GND, LN5 as a ground line, respectively. The current mirror circuits 36, 47 output the reference current to the overcharge detection circuit 33 that operates based on the other voltage lines as the ground line. Therefore, the early-effect cancellation circuits 45, 50 are connected to the transistors Q36, Q46, respectively. In such an approach, collector-to-emitter voltages of the transistors Q36, Q46 are clamped to the forward voltage VF so that the variations in the reference current output to the overcharge detection circuit 33 can be significantly reduced.

The effects of the current compensation circuits 49, 52 and the early effect cancellation circuits 45, 50 have been simulated. FIG. 6 is a table showing the simulation result. In the simulation, reference currents I1-I8 input to the overcharge detection circuits 33 for the cells BC1-BC8 have been measured under condition that the temperature is 27° C. and potentials V1-V8 of the terminals T1-T8 of the cells BC1-BC8 are 32.8 V, 28.7 V, 24.6 V, 20.5 V, 16.4 V, 12.3 V, 8.2 V, and 4.1 V, respectively. The potentials V1-V8 are intentionally varied. A target value for each of the reference currents I1-I8 is set to 5.214 μA .

As can been seen from FIG. 6, when the potentials V1-V8 of the cells BC1-BC8 are not the same, the early-effect cancellation circuits 45, 50 operate effectively so that reference current differences not only within each subgroup but also between each subgroup can be reduced and the reference current can be made to very close to the target value of 5.214 μA.

As described in the above equations (2)-(7), the current compensation circuits 49, 52 can reduce the reference current differences from the target value and between each subgroup.

Thus, the early-effect cancellation circuits 45, 50 and the current compensation circuits 49, 52 make the mirror ratio very close to 1 so that the accuracy of the reference current can be improved, i.e., the reference current can be highly regulated at the target value. The current compensation circuit 57 of the overcharge detection circuit 33 functions in the same manner as the current compensation circuits 49, 52.

Figure 7:
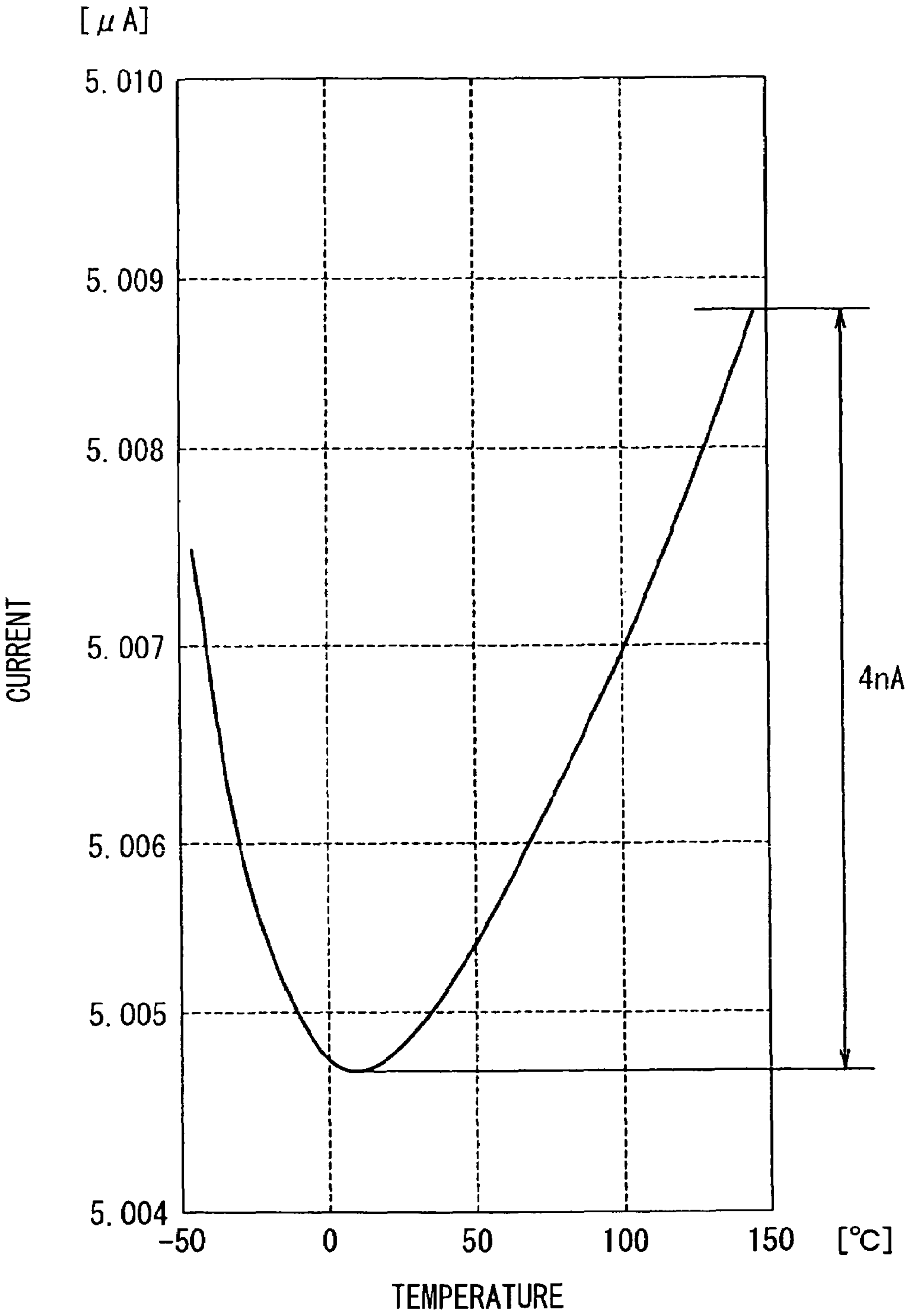
FIG. 7 is a graph showing a simulation result of temperature dependence of the reference current observed when a current mirror circuit used in the overcharge detection circuit of FIG. 5 has a current compensation circuit.
Figure 8:
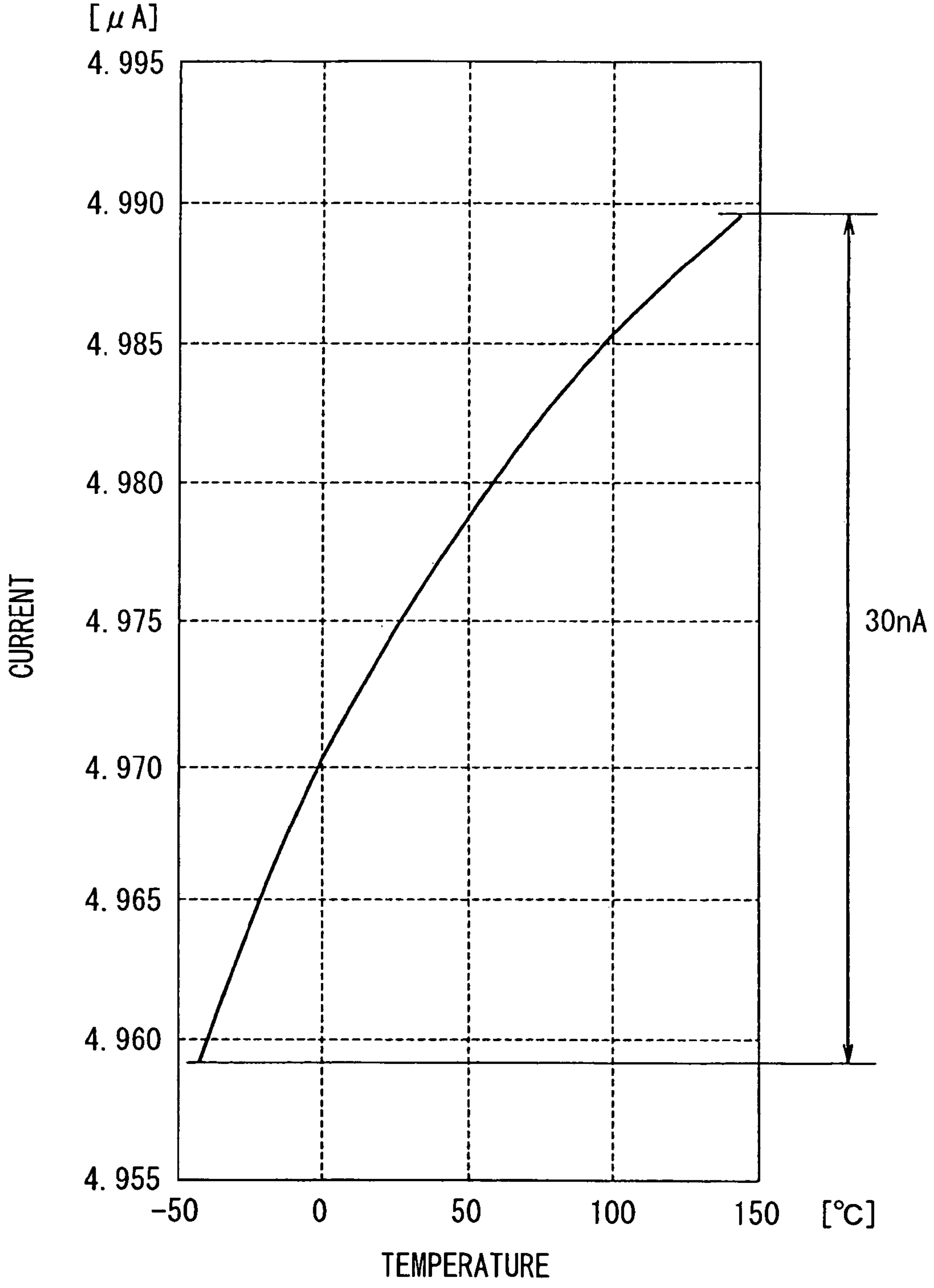
FIG. 8 PRIOR ART
FIG. 8 is a graph showing a simulation result of temperature dependence of the reference current observed when the current mirror circuit used in the overcharge detection circuit of FIG. 5 has no current compensation circuit.
Figure 10:
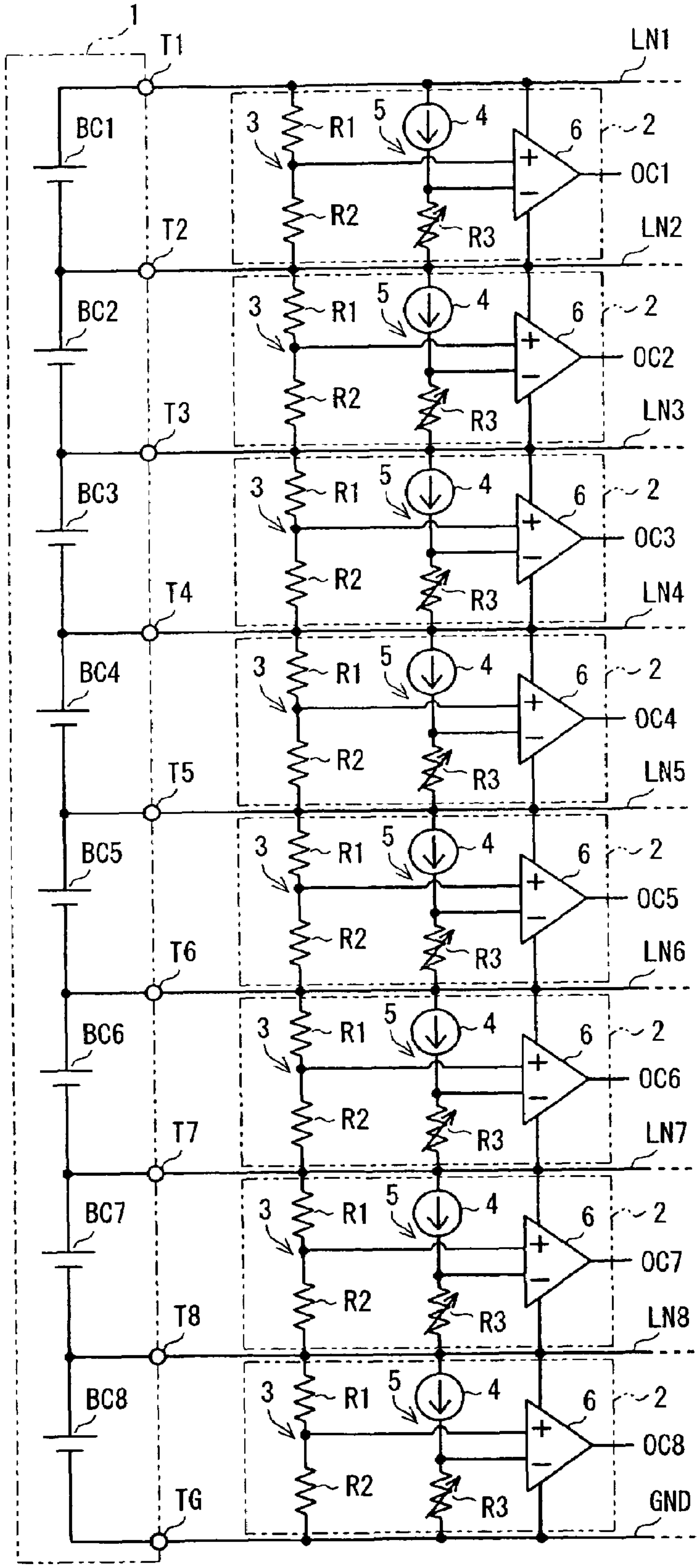
FIG. 10 PRIOR ART
FIG. 10 is a schematic of a constant current circuit and an overcharge detection circuit according to prior art.

FIGS. 7 and 8 are graphs illustrating simulation results of dependence of the current output from the current mirror circuit 56 on temperature. The simulations are performed over a temperature ranging from minus 40 degrees Celsius (−40° C.) to plus 140 degrees Celsius (140° C.), because the assembled battery 1 and the control IC 32 are mounted in the vehicle where temperature generally varies from −40° C. to 140° C. FIG. 7 shows the case where the current mirror circuit 56 has the current compensation circuit 57 and FIG. 8 shows the case where the current mirror circuit 56 doesn't have the current compensation circuit 57.

As can been seen from FIG. 7, when the current mirror circuit 56 has the current compensation circuit 57, a range of variation in the current is about 4 nanoamperes (nA). In contrast, as can been seen from FIG. 8, when the current mirror circuit 56 doesn't have the current compensation circuit 57, the range of variation in the current is about 30 nA. Thus, the current compensation circuit 57 can reduce the dependence of the current output from the current mirror circuit 56 on temperature. The same holds true for the current mirror circuits 47, 48.

As described above, the base lines of the current mirror circuits 39, 36, 47, 48, 56 are connected to the resistors R32, R33, R37, R35, R44, respectively, each of which has the relatively low resistance. Thus, the resistance to noise can be increased and the leakage current through the transistors can be prevented.

The current mirror circuits 47, 48, 56 have the current compensation circuits 52, 49, 57, respectively. The current compensation circuits 52, 49, 57 generate the compensation current for compensating the base current of the transistors Q47, Q42, Q58 based on the resistor R37, R35, R44, respectively. Thus, each of the mirror ratios of the current mirror circuits 47, 48, 56 can be made very close to 1.

The current mirror circuits 36, 47 have the early-effect cancellation circuits 45, 50, respectively, that reduce the early effect due to the potential difference between each overcharge detection circuit 33.

Thus, the variations between output and input currents of the current mirror circuits 36, 47, 48, 56 can be reduced so that the variations between each of the reference current supplied to each trim resistor R11 can be reduced. Further, the reference current can be made very close to the target value.

The current compensation circuits 49, 52, 57 reduce the variations in the current (i.e., mirror ratio) even when the temperature changes significantly. Therefore, the assemble battery 1 and the control IC 32 can be used in the vehicle without the loss of accuracy.

In this embodiment, not all of the overcharge detection circuits 33 for the cells BC1-BC8 need to have the bandgap reference circuit 18. Therefore, the control IC 32 can have simple configuration, i.e., small size without the loss of accuracy so that manufacturing cost of the control IC 32 can be significantly reduced.

As described above, one cell group includes the eight cells BC1-BC8 that are connected in series. The group of the eight cells BC1-BC8 is divided into two cell subgroups. The first cell subgroup includes the four cells BC1-BC4 and the second cell subgroup includes the four cells BC5-BC8. The current mirror circuit 35 (47, 48) is provided to the first subgroup of the four cells BC1-BC4 such that the emitters of the transistors Q45, Q46 are connected to the voltage line LN5 connected to the terminal T5. The terminal T5 is the negative terminal of the cell BC4 that is arranged on the lowest potential side in the first cell subgroup. The current mirror circuit 36 is provided to the second subgroup of the four cells BC5-BC8 such that the emitters of the transistors Q35, Q36 are connected to the voltage line GND connected to the terminal TG. The terminal TG is the negative terminal of the cell BC8 that is arranged on the lowest potential side in the second cell subgroup.

In this case, a collector-to-emitter voltage VCE(Q48) of the transistor Q48 of the current mirror circuit 47 satisfies the following equation:

$$VCE(Q48) \leqq VBC1+VBC2+VBC3+VBC4 \approx 4 \cdot VBC \quad (9)$$

In the equation (9), VBCN is the voltage of the cell BCN, where N is the positive integer between 1 and 4 inclusive and VBC is the average voltage of the cells BC1-BC4.

Third Embodiment

Figure 9:
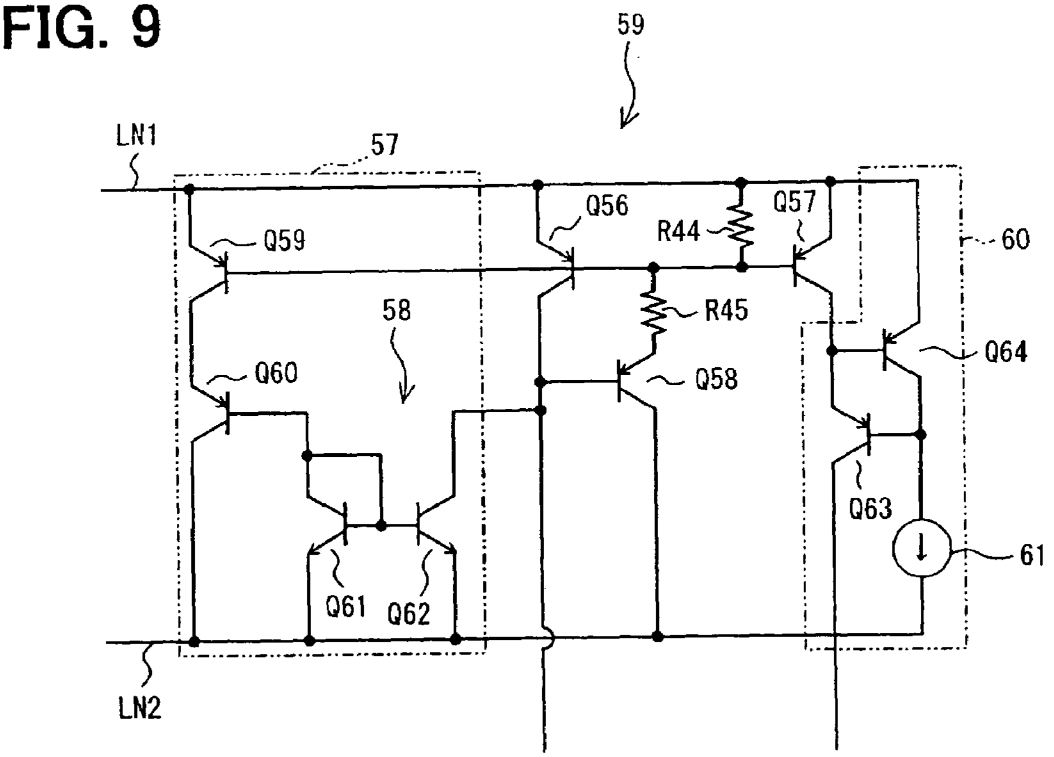
FIG. 9 is a schematic of an overcharge detection circuit according to a third embodiment of the present invention.

Referring to FIG. 9, a third embodiment of the present invention is described. In the third embodiment, each overcharge detection circuit 33 has a current mirror circuit 59 shown in FIG. 9 instead of the current mirror circuit 56. The current mirror circuit 59 is formed by adding an early-effect cancellation circuit 60 to the current mirror circuit 56. The early-effect cancellation circuit 60 includes transistors Q63 (as the sixth transistor), Q64 (as the seventh transistor), and a constant current circuit 61.

As an example, in the overcharge detection circuit 33 for the cell BC1, the transistor Q63 has the emitter connected to the collector of the transistor Q57 and the collector connected to the trim resistor R41. The transistor Q64 has the emitter connected to the voltage line LN1, the collector connected to the base of the transistor Q63, and the base connected to the collector of the transistor Q57, i.e., the emitter of the transistor Q63. The constant current circuit 61 is connected between the collector of the transistor Q64 and the voltage line LN2. The early-effect cancellation circuit 60 reduces the early effect due to a variation in the voltage VBC1 of the cell BC1 so that a very highly accurate reference current can flow through the trim resistor R41.

Modifications

The embodiments described above may be modified in various ways. For example, the cell group of the eight cells BC1-BC8 may be divided into three or more cell subgroups and the current mirror circuit is provided to each of the cell subgroups. In this case, it is preferable that the cell subgroups have the same number of the cells.

The early-effect cancellation circuits 45, 50 may be optional.

The reference current output circuits 26, 42 may be provided to the first cell subgroup of the cells BC1-BC4 instead of the second cell subgroup of the cells BC5-BC8. Various types of constant current circuits can be used as the reference current output circuits 26, 42. For example, the reference current output circuits 26, 42 can be replaced with a Wilson current source, a self-biased constant current circuit, a constant current circuit for outputting a constant current that depends on a forward voltage of a transistor and a resistance of a resistor, or a constant current circuit having a zener diode and a voltage-to-current converter.

Various types of semiconductor devices such as a metal oxide semiconductor field-effect transistor (MOSFET) may be used instead of the bipolar transistors. The PNP transistors can be used instead of the NPN transistors. Likewise, the NPN transistors can be used instead of the PNP transistors.

The assembled battery 1 may be made of lead cells or nickel-hydrogen cells. The current mirror circuits such as the current mirror circuits 17, 18, 26, and 29 can be applied to various applications including the constant current circuit.

Such changes and modifications are to be understood as being within the scope of the present invention as defined by the appended claims.

What is claimed is:

1. A current mirror circuit comprising:

a first transistor that has an emitter connected to a power line, an input current of the current mirror circuit flowing through the first transistor;

a second transistor that has an emitter connected to the power line and a base connected to a base of the first transistor, an output current of the current mirror circuit flowing through the second transistor;

a resistor that has a first end connected between the bases of the first and second transistors and a second end connected to the power line;

a third transistor that has an emitter connected to the base of the first transistor and a base connected to a collector of the first transistor, the third transistor supplying a base current to each of the first and second transistors; and a current compensation circuit that adds a compensation current to the input current flowing through the first transistor, wherein the resistor has a predetermined resistance that allows a resistor current flowing through the resistor to be larger than the base current, the compensation current is approximately equal to a value obtained by dividing the resistor current by a current gain (hFE) of the third transistor, the resistance of the resistor allows the resistor current to be approximately equal to the input current flowing through the first transistor or the output current flowing through the second transistor, the current compensation circuit includes a fourth transistor and a fifth transistor connected in series with the fourth transistor, the fourth transistor passes a current equal to the input current or the output current there through, and the compensation current is a base current of the fifth transistor.

2. The current mirror circuit according to claim 1, wherein the fourth transistor has an emitter connected to the power line and a base connected to each of the bases of the first and second transistors, and the current compensation circuit further includes another current mirror circuit that reverses a direction of flow of the base current of the fifth transistor.

3. A constant current circuit for supplying a constant current to a plurality of circuits, each of the plurality of circuits provided to a respective one of a plurality of secondary cells, the plurality of secondary cells connected in series to form an assembled battery, the constant current circuit comprising:

a plurality of first current mirror circuits each of which is provided to a respective one a plurality of groups into which the plurality of secondary cells and the plurality of circuits are divided, each first current mirror circuit supplied with a reference current and outputting the reference current to the respective one of the plurality of the groups;

a reference current output circuit that is provided to one of the plurality of groups and outputs the reference current to the first current mirror circuit of the one of the plurality of groups; and a second current mirror circuit that is provided to an other of the plurality of groups, the second current mirror circuit supplied with the reference current derived from the reference current output circuit and outputting the reference current to the first current mirror circuit of the other of the plurality of groups, wherein each of the first and second current mirror circuits of the other of the plurality of groups is defined in claim 1.

4. The constant current circuit according to claim 3, wherein the plurality of secondary cells and the plurality of circuits are divided into the plurality of groups from a lower potential side to a higher potential side of the assembled battery, each first current mirror circuit is connected to the power line connected to a negative terminal of one of the secondary cells of the respective group, and the one of the secondary cells is arranged on a lowest potential side in the respective group.

5. The constant current circuit according to claim 3, wherein each of the plurality of groups has the same number of the secondary cells.

6. The constant current circuit according to claim 3, wherein the reference current output circuit includes a bandgap reference circuit and a voltage-to-current conversion circuit.

7. The constant current circuit according to claim 3, wherein each of the plurality of circuits includes an overcharge/overdischarge detection circuit that has a reference voltage generation circuit and a comparison circuit, the reference voltage generation circuit generates a reference voltage that depends on the constant current supplied from the first current mirror circuit of the respective group, and the comparison circuit compares the reference voltage with a cell voltage of the respective one of the secondary cells.

8. A current mirror circuit comprising:

a first transistor that has an emitter connected to a power line, an input current of the current mirror circuit flowing through the first transistor;

a second transistor that has an emitter connected to the power line and a base connected to a base of the first transistor, an output current of the current mirror circuit flowing through the second transistor;

a resistor that has a first end connected between the bases of the first and second transistors and a second end connected to the power line;

a third transistor that has an emitter connected to the base of the first transistor and a base connected to a collector of the first transistor, the third transistor supplying a base current to each of the first and second transistors;

a current compensation circuit that adds a compensation current to the input current flowing through the first transistor; and an early-effect cancellation circuit that includes a fourth transistor and a fifth transistor, wherein the resistor has a predetermined resistance that allows a resistor current flowing through the resistor to be larger than the base current, the compensation current is approximately equal to a value obtained by dividing the resistor current by a current gain of the third transistor, the fourth is connected in series with the second transistor on a collector side of the second transistor, the fifth transistor has an emitter connected to the power line, a base connected to the collector of the second transistor, and a collector connected to a base of the fourth transistor, and the output current flows from the second transistor to the fourth transistor.

9. A constant current circuit for supplying a constant current to a plurality of circuits, each of the plurality of circuits provided to a respective one of a plurality of secondary cells, the plurality of secondary cells connected in series to form an assembled battery, the constant current circuit comprising:

a plurality of first current mirror circuits each of which is provided to a respective one of a plurality of groups into which the plurality of secondary cells and the plurality of circuits are divided, each first current mirror circuit supplied with a reference current and outputting the reference current to the respective one of the plurality of the groups;

a reference current output circuit that is provided to one of the plurality of groups and outputs the reference current to the first current mirror circuit of the one of the plurality of groups; and a second current mirror circuit that is provided to an other of the plurality of groups, the second current mirror circuit supplied with the reference current derived from the reference current output circuit and outputting the reference current to the first current mirror circuit of the other of the plurality of groups, wherein each of the first and second current mirror circuits of the other of the plurality of groups is defined in claim 8.

10. The constant current circuit according to claim 9, wherein the plurality of secondary cells and the plurality of circuits are divided into the plurality of groups from a lower potential side to a higher potential side of the assembled battery, each first current mirror circuit is connected to the power line connected to a negative terminal of one of the secondary cells of the respective group, and the one of the secondary cells is arranged on a lowest potential side in the respective group.

11. The constant current circuit according to claim 9, wherein each of the plurality of groups has the same number of the secondary cells.

12. The constant current circuit according to claim 9, wherein the reference current output circuit includes a bandgap reference circuit and a voltage-to-current conversion circuit.

13. The constant current circuit according to claim 9, wherein each of the plurality of circuits includes an overcharge/overdischarge detection circuit that has a reference voltage generation circuit and a comparison circuit, the reference voltage generation circuit generates a reference voltage that depends on the constant current supplied from the first current mirror circuit of the respective group, and the comparison circuit compares the reference voltage with a cell voltage of the respective one of the secondary cells.

* * * * *